(12) United States Patent
Saltzman

(10) Patent No.: US 9,519,976 B1
(45) Date of Patent: Dec. 13, 2016

(54) CALIBRATING STEREOSCOPIC CAMERAS

(75) Inventor: Jeffrey Saltzman, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 1510 days.

(21) Appl. No.: 13/015,655

(22) Filed: Jan. 28, 2011

(51) Int. Cl.
*G06T 7/60* (2006.01)
*G06T 7/20* (2006.01)
*H05B 33/08* (2006.01)

(52) U.S. Cl.
CPC ......... *G06T 7/2033* (2013.01); *H05B 33/0869* (2013.01)

(58) Field of Classification Search
USPC .............. 356/601–13; 348/207.99, 169, 335; 382/103, 106, 154
See application file for complete search history.

(56) References Cited

U.S. PATENT DOCUMENTS

| | | | |
|---|---|---|---|
| 2002/0129626 A1* | 9/2002 | Kawamura et al. | 66/232 |
| 2004/0234122 A1* | 11/2004 | Kochi et al. | 382/154 |
| 2007/0034775 A1* | 2/2007 | Cheng et al. | 250/205 |
| 2007/0139525 A1* | 6/2007 | Amphlett | 348/207.99 |
| 2007/0206832 A1* | 9/2007 | Gordon et al. | 382/103 |
| 2008/0075324 A1* | 3/2008 | Sato et al. | 382/106 |
| 2009/0080036 A1* | 3/2009 | Paterson et al. | 358/474 |
| 2010/0134634 A1* | 6/2010 | Witt | 348/181 |
| 2012/0105611 A1* | 5/2012 | Godar | 348/54 |

OTHER PUBLICATIONS

Li et al. Accurate Calibration of Stereo Cameras for Machine Vision, JCS&T vol. 4 No. 3, Oct. 2004, pp. 147-151).*
Li et al., Accurate Calibration of Stereo Cameras for Machine Vision, JCS&T vol. 4 No. 3, Oct. 2004, pp. 147-151.*
Masuji Suto, "StereoPhoto Maker (English)", Jun. 21, 2009, downloaded from the internet at: http://web.arehive.org/web/20090621104628/http:/stereo.jpn.org/eng/stphmkr/ on Jun. 23, 2011, 6 pages.

(Continued)

*Primary Examiner* — Medrdad Dastouri
*Assistant Examiner* — Joseph Becker
(74) *Attorney, Agent, or Firm* — Kilpatrick Townsend & Stockton LLP

(57) ABSTRACT

A stereoscopic camera calibration target includes: first illumination points on a first surface; second illumination points on a second surface, the first and second surfaces being planar, parallel to each other, and spaced from each other; and circuitry that sets a strobe frequency of the first and second illumination points. A method includes: moving a calibration target in front of a stereoscopic camera, the calibration target comprising first points on a first surface and second points on a second surface, the first and second surfaces being planar, parallel to each other, and spaced from each other; capturing, using the stereoscopic camera, an image sequence of the calibration target, the image sequence comprising pairs of left and right images of at least some of the first and second points; determining a calibration value for the stereoscopic camera using the image sequence; and processing the image sequence using the calibration value.

22 Claims, 6 Drawing Sheets

(56) References Cited

OTHER PUBLICATIONS

Quantel.com, "Quantel White Paper: Stereoscopic 3D Post Using the 3ality Digital 3flexTM SIP2100", downloaded from the internet at http://www.quantel.com/respository/files/whitepapers_sip2100november08.pdf on Jun. 23, 2011, Nov. 2008, 14 pages.
Sony Electronics, Inc. "Sony Stereo Image Processor Software MPES-3D01 User's Guide", 1st Edition (Revised 3), Software Version 1.20, 2009, downloaded from the internet at: http://ws.sel.sony.com/PIPWebServices/RetrievePublicAsset/StepID/MPES3D01_V1.20_UserGuide/original/MPES3D01_V1.20_UserGuide.pdf on Jun. 23, 2011, 116 pages.
Sony Electronics, Inc. "MPES3D01/01 Stereo Image Processor Software", downloaded from the internet at: http://pro.sony.com/bbsc/ssr/product-MPES3D01/01 on Jun. 23, 2011, 2 pages.
The Foundry Visionmongers, Ltd "OCULA 2.2 User's Guide", 2011, downloaded from the internet at http://thefoundry.s3.amazonaws.com/products/ocula/nuke/documentation/Ocula_2.2v1_Nuke_User_Guide.pdf on Jun. 23, 2011, 101 pages.
The Foundry Visionmongers, Ltd "OCULA Features", 2011, downloaded from the internet at: http://www.thefoundry.co.uk/products/ocula/features on Jun. 23, 2011, 2 pages.

\* cited by examiner

CALIBRATING STEREOSCOPIC CAMERAS

TECHNICAL FIELD

This document relates to stereoscopic imagery.

BACKGROUND

Stereoscopic imagery is a technology for creating the illusion of depth in two-dimensional images. Many stereoscopic images consist of a set of two images, one to be viewed by a viewer's right eye and one to be viewed by a viewer's left eye. The two images, sometimes called left eye view and right eye view or primary view and secondary view, can be created by an offset pair of cameras recording the same subject, or an offset pair of virtual cameras rendering the same scene.

Some stereoscopic cameras record video in the form of a series of stereoscopic images. These cameras can have many of the same features as other video cameras for controlling recording, such as circular shutters, adjustable frame rates, and zoom lenses. Stereoscopic video cameras can be synchronized to record images for the left eye view and right eye view simultaneously or alternately.

SUMMARY

In a first aspect, a calibration target for a stereoscopic camera includes: first illumination points on a first surface; second illumination points on a second surface, the first and second surfaces being planar, parallel to each other, and spaced from each other; and circuitry that sets a strobe frequency of the first and second illumination points.

Implementations can include any or all of the following features. Each of the first illumination points are of a color in a first plurality of colors and each of the second illumination points are of a color in a second plurality of colors, the first plurality of colors not comprising any of the colors in the second plurality of colors. The first illumination points and the second illumination points are color coded according to a predefined pattern. The first surface comprises a first opening through which at least a portion of the second surface is visible. The first and second surfaces are rectangular. The first illumination points are arranged in a first row on the first surface. The second illumination points are arranged in a second row on the second surface, the second row perpendicular to the first row. The circuitry sets the strobe frequency to any of multiple predefined strobe frequencies. The set strobe frequency is based at least in part on a shutter speed value of the stereoscopic camera. The circuitry comprises an interface for receiving a frame speed value and a shutter angle value, and wherein the circuitry determines the shutter speed based on the frame speed and shutter angle. Each of the first illumination points comprises a light emitting diode controlled by the circuitry. Each of the first illumination points comprises a light tube controlled by the circuitry.

In a second aspect, a method includes: moving a calibration target in front of a stereoscopic camera, the calibration target comprising first points on a first surface and second points on a second surface, the first and second surfaces being planar, parallel to each other, and spaced from each other; capturing, using the stereoscopic camera, an image sequence of the calibration target, the image sequence comprising pairs of left and right images of at least some of the first and second points; determining a calibration value for the stereoscopic camera using the image sequence; and processing the image sequence using the calibration value.

Implementations can include any or all of the following features. The first and second points include illumination points, and the method further includes strobing the illumination points at a strobe frequency while capturing the image sequence. The method further includes determining a frame speed, the strobe frequency selected based on the frame speed. The first points are out of focus in the image sequence. The method further includes performing a center-finding technique. Determining the calibration value comprises: (i) creating a virtual calibration target, and virtual stereoscopic camera with the image sequence, in a virtual world (ii) identifying representations of at least some of the first and second points in the image sequence, and (iii) adjusting the virtual stereoscopic camera to match the identified representations.

In a third aspect, a system includes: a stereoscopic camera; and a calibration target for the stereoscopic camera, the calibration target comprising first points on a first surface and second points on a second surface, the first and second surfaces being planar, parallel to each other, and spaced from each other.

Implementations can include any or all of the following features. The first and second points include illumination points, the system further comprising circuitry that sets a strobe frequency of the illumination points. The circuitry sets the strobe frequency to any of multiple predefined strobe frequencies; and wherein the set strobe frequency is based at least in part on a shutter speed of the stereoscopic camera. The circuitry comprises an interface for receiving a frame speed value and a shutter angle value, and wherein the circuitry determines the shutter speed based on the frame speed and shutter angle.

Implementations can provide any or all of the following advantages: Calibration of stereoscopic cameras can be improved. A calibration target can have proportions particularly suited for use with cameras having the interocular distance of stereoscopic cameras. Providing that actual inter-camera alignment can be accurately determined before determining the camera's alignment to the scene that is to be viewed. Providing an aligned stereo camera pair that can more easily be aligned with the scene.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques regarding stereoscopic cameras. In some implementations, a calibration target is used in calibrating a virtual stereoscopic camera. As described below, a calibration target can have two camera-facing surfaces with illumination points. Images of the calibration target can be recorded by the stereoscopic camera as the target moves, and a sequence of stereoscopic images of the target can be generated. The image sequences can be analyzed to create a virtual stereoscopic camera with the same or similar calibration settings as the stereoscopic camera that recorded the image sequence. The virtual stereoscopic camera can be used, for example, to post-process additional footage recorded by the stereoscopic camera.

Figure 1:
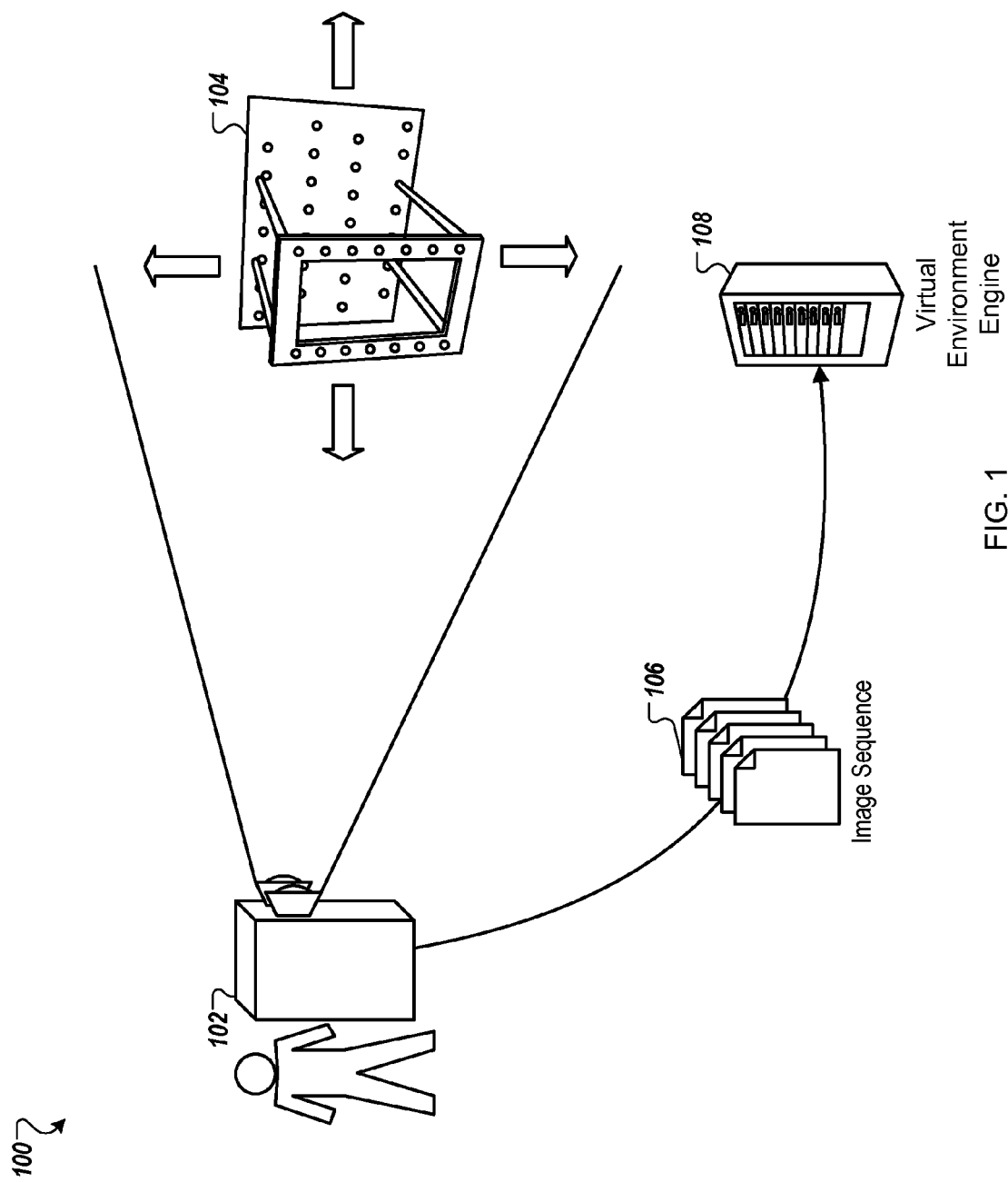
FIG. 1 is a block diagram of an example system for calibrating a stereoscopic camera.

FIG. 1 is a block diagram of an example system 100 for calibrating a stereoscopic camera. A stereoscopic camera 102 can record stereoscopic images and/or stereoscopic video. The stereoscopic camera 102 can record to film (e.g., a film camera) or to a computer readable medium (e.g., a digital camera), to name some examples. The stereoscopic camera 102 can have a number of settings controllable to affect the nature and characteristics of images recorded. For example, frame rate, shutter angle, and stereoscopic displacement can be adjusted by an operator, either by making physical changes to the camera (e.g., replacing a shutter, adjusting the placement of a lens or mirror, etc.) or through a computer controlled input device (e.g., setting frame rate or shutter angle with a push button).

Differences have been observed between, on the one hand, the calibration settings of a stereoscopic camera (e.g., the set interocular or convergence distance), and on the other hand, the actual interocular or convergence distance. For example, when an interocular distance of 2.0 inches is set on a stereo camera, the actual interocular distance (i.e., the physical separation of the respective nodal points in the two stereo cameras) is actually somewhat less or more than two inches. Factors contributing to such discrepancies include, but are not limited to: calibration of the settings equipment (e.g., whether the actual value is consistently lower, or higher, than the set value); the amount of arithmetic precision (e.g., whether the camera equipment allows the interocular or convergence distance to be entered using a precision of two or three digits); limitations in human registration of set values (e.g., a user inspects a mechanical camera setting but records a somewhat different settings value that what is actually displayed.)

In some situations, errors in calibration settings are large enough that, when the same value is later used to calibrate a second stereoscopic camera, noticeable artifacts are created in images recorded or rendered with the second stereoscopic camera. These artifacts may be noticeable when images from the stereoscopic camera 102 are combined or superimposed with images from the second stereoscopic camera, for example in post-production.

In the example system 100, the stereoscopic camera 102 can record a calibration target 104. In short, the calibration target 104 is moved before the stereoscopic camera 102 such that stereo images of the target are captured from various angles. Subsequently, the stereo images will be processed and analyzed to determine actual settings values for the stereoscopic camera 102. In some implementations, the stereoscopic camera 102 need not be properly focused on the calibration target 104 for the images to be useful.

The calibration target 104 can have two camera-facing surfaces, which are planar, parallel to each other, and offset from each other. The front camera-facing surface can have a rectangular opening and can be smaller than the rear camera-facing surface so that at least a portion of the rear surface is visible through and around the front camera-facing surface. Such and/or other features of the calibration target can facilitate or simplify subsequent image processing to calibrate the stereo camera.

Both camera-facing surfaces can have one or more illumination points, for example comprised of light emitting diodes (LEDs) and/or light tubes. The illumination points can form two vertical rows on the front camera-facing surface, for example. On the rear camera-facing surface, four horizontal rows perpendicular to the vertical rows. Illumination points of a first set of color can be on the front camera-facing surface and of a second set of colors on the rear camera-facing surface. For example, the colors of these illumination points can be color coded to aid in identification when examining images of the calibration target.

Circuitry in the calibration target or elsewhere can control the illumination points, for example turning the illumination points on and off. The strobe rate can be controlled by the circuitry and based on user input to the circuitry. For example, a user can enter the frame rate and shutter angle settings of the stereoscopic camera 102, and the circuitry can determine a strobe rate that ensures one and only one illumination per frame.

An image sequence 106 can be recorded by the stereoscopic camera 102. The stereoscopic camera 102 can be set to record video, and an operator can move the calibration target 104 through the stereoscopic camera's 102 field of view. For example, the calibration target can be held by the photographer or an assistant. As another example, the calibration target 104 can remain essentially stationary and the stereoscopic camera 102 can be moved relative to the calibration target 104. In some examples, the calibration target 104 can be out of focus in some or all of the image sequence 106.

The image sequence 106 can be sent to a virtual environment engine 108 implemented using at least one computer-readable storage device and a processor that executes instructions. The virtual environment engine 108 can create a virtual three-dimensional environment having a virtual stereoscopic camera and a virtual model calibration target. The virtual model calibration target is geometrically defined to have the same shape as the calibration target 104. The virtual environment engine can calibrate the virtual stereoscopic camera so that, if an image sequence of the virtual calibration target is rendered by the virtual stereoscopic camera, the image sequence would be the same or similar as the image sequence 106. For example, the virtual environment engine 108 seeks to define the virtual environment to have the same or similar properties as the physical space where the image sequence 106 was captured.

Figure 2A:
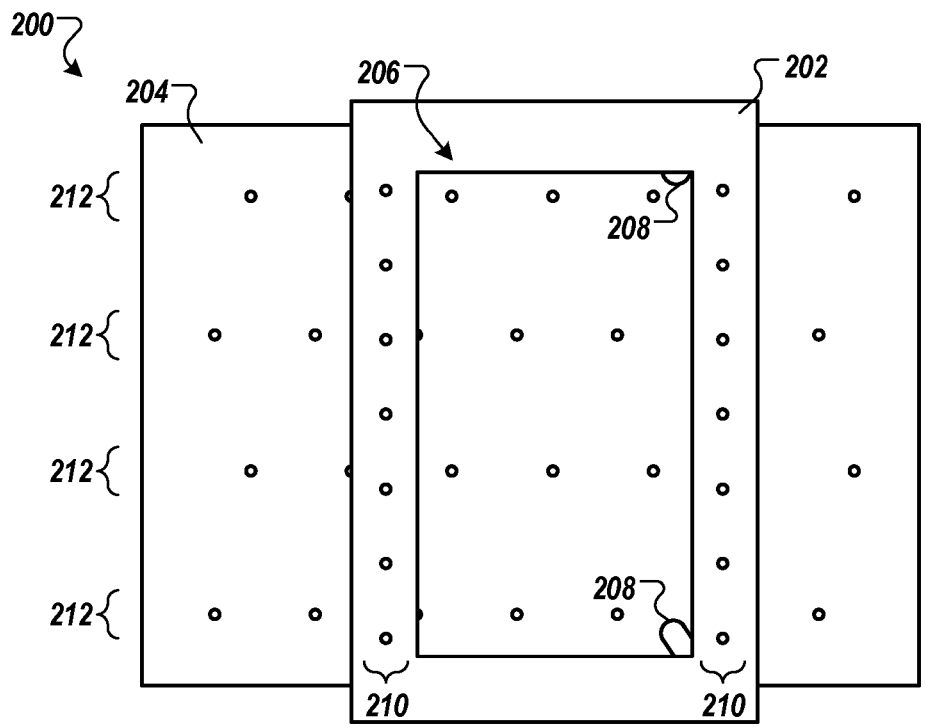
FIG. 2A is a frontal view of an example calibration target.

FIG. 2A is a frontal view of an example calibration target 200. The frontal view, for example, may be the view shown to a stereoscopic camera collecting a calibration image sequence. The external case of the calibration target may be made of, for example, polymer, wood, or sheet metal. Components may be fastened together with screws, adhesive, or interlocking parts. Some or all of the components may be hollow, for example to allow space for circuitry, wiring, etc. In some implementations, the calibration target 200 is manufactured substantially in one piece, for example using molding or casting techniques. The calibration target can have a surface 202 and a surface 204. The surface 202 and the surface 204 can be planar, offset from each other, and parallel to each other. The surface 202 can have at least one cut out 206, through which some or all of the surface 204 is visible. One or more pillars 208 (two of which are visible, and two obstructed, in this example) can space the surface 202 and the surface 204 from each other. In the shown example, the distance between the surfaces 202 and 204 is comparable to the length of one side of the surface 202. In other implementations, a smaller or greater spacing can be used.

In some implementations, the calibration target 200 is partly or fully collapsible. For example, either or both of the surfaces 202 and 204 can be removable from the rest of the calibration target. As another example, the pillar(s) 208 can be telescopic or hinged.

The surface 202 can have one or more vertical columns of illumination points 210. In some implementations, the illumination points 210 are all of the same color, brightness, shape and/or size. In some implementations, the illumination points 210 are of two or more colors, the color coding selected at random or according to a predetermined scheme. For example, in one scheme, any ordered set of four illumination points may have a unique color coding. This scheme may be useful, for example, in identifying illumination points in an image in which some illumination points are obstructed or out of the frame of the image.

The surface 204 can have one or more horizontal rows of points, for example illumination points 212. In some implementations, the illumination points 212 are all of the same color. In some implementations, the illumination points 212 are of two or more colors, the color coding selected at random or according to a predetermined scheme. The rows of illumination points 212 can be horizontally offset from each other, such as to avoid creating vertical columns of illumination points 212 on the surface 204.

Some or all of the points can be illumination points. Other examples of points on the surface 202 and/or 204 include, but are not limited to, dots, depressions, holes, reflectors, mirrors, matte patches, pins, beads, and combinations thereof.

Figure 2B:
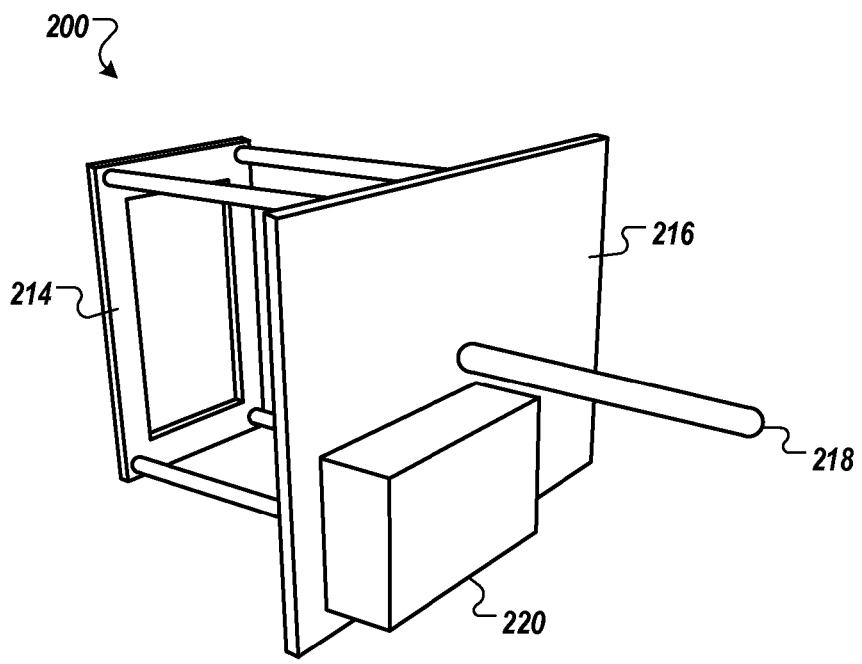
FIG. 2B is a perspective view of an example calibration target.

FIG. 2B is a perspective view of an example calibration target 200. The perspective view, for example, may be the view seen by an operator of the calibration target while the operator moves the calibration target in front of a stereoscopic camera.

A surface 214 can be the backside of the surface 202, and a surface 216 can be the backside of the surface 204. At least one handle 218 can be affixed to the surface 216. The handle 218 can be used, for example, by a user moving the calibration target and can provide a handle or another area to grasp without obstructing the surfaces 202 and/or 204. A cylindrical rod handle is shown here, but other types and/or more handles are possible, for example depending on the size and weight of the calibration target 200.

The calibration target 200 can have an electrical housing 220. In some implementations, the electrical housing 220 can be affixed to the surface 216, as illustrated in this example, or to the surface 204. In some implementations, the electrical housing 220 can be contained between the surfaces 204 and 216, or can form one or both of the surfaces. In some implementations, the electrical housing 220 can be included in one or more of the pillars 208, or can form one or more of the pillars.

The electrical housing 220 can contain circuitry, a power source, and/or wires used to receive input and control the illumination points 210 and the illumination points 212. The electrical housing can have one or more ports for input and/or output. For example, a liquid crystal display may request settings (shutter angle, frames per second and/or exposure length, etc.), and a keypad can receive user input. In another example, an Ethernet port can receive an Ethernet cable to receive setting information. In another example, a wireless receiver can receive setting information from a transmitter. Example locations of such a transmitter include, but are not limited to, a handheld remote control, the stereoscopic camera, a computer or other terminal, the virtual environment engine 108, a cellular telephone, and combinations thereof.

In one implementation, the electrical housing 220 can have a sheet metal shell, hinged to the surface 216 along one edge and having a latch on one or more of the other edges.

Figure 3:
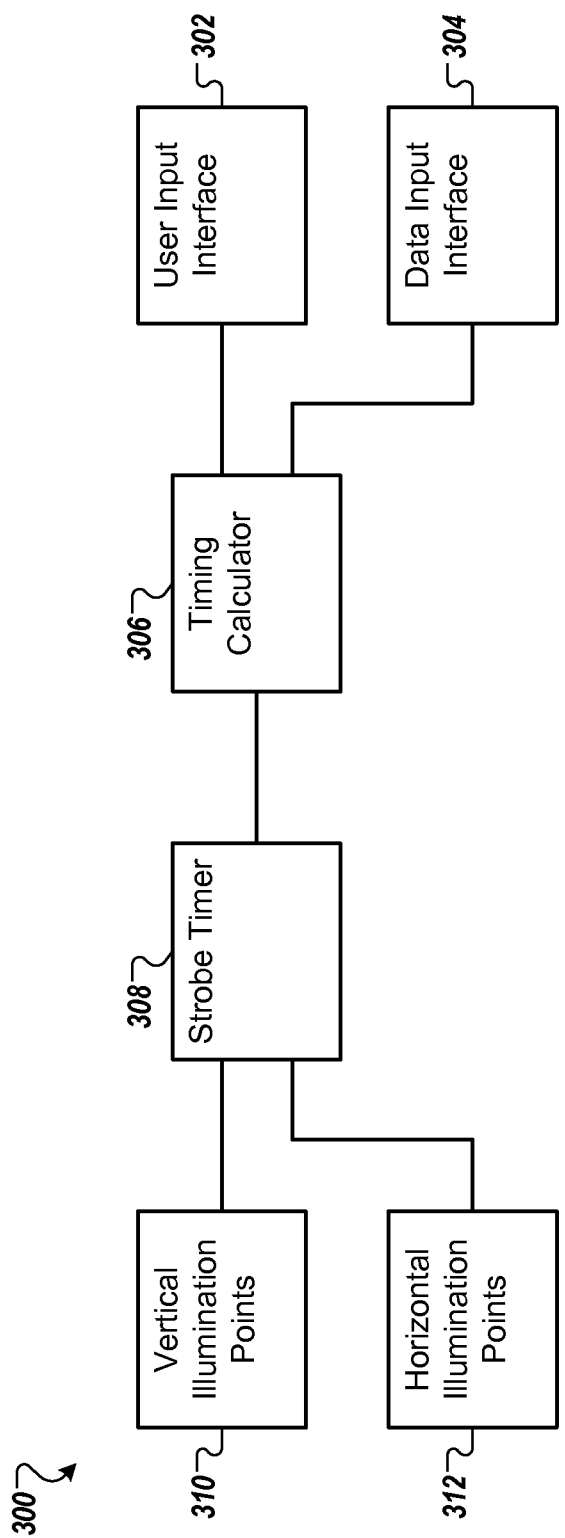
FIG. 3 is a block diagram of an example system for controlling illumination points.

FIG. 3 is a block diagram of an example system 300 for controlling illumination points. For example, the system 300 can be incorporated into the calibration target 100 and/or the calibration target 200. The system 300 can receive information about film recording, and can illuminate illumination points at a rate calculated to be once per frame of the film.

A user input interface 302 and/or a data input interface 304 can accept camera settings. For example, a frame rate and a shutter angle set on a stereoscopic camera can be entered. The user interface 302 can include any suitable input components including, but not limited to, keypads, push buttons, dials and/or switches and can include one or more output components including, but not limited to, LEDs, liquid crystal displays, a buzzer and/or labels. The data input interface 304 can receive data communication from another system. For example, wired or wireless communication sent to the data input interface 304 from a computer or stereoscopic camera can contain camera settings.

A timing calculator 306 can determine frequency and length of illuminations. When the calibration target is in motion while images are captured, the illumination points can create streaks in the images. Pulsing or strobing the illumination points can prevent or reduce the occurrence of streaks.

In some implementations, the frequency of the illuminations can be matched to the shutter speed that is input to the user input interface 302 or the data input interface 304. For example, one flash or illumination can be generated for each pair of left and right frames that the camera captures. The illumination points can be configured to be illuminated for a single illumination duration each time the shutter is open. The shutter speed can be determined using the formula:

shutter speed=frame rate*(360/shutter angle)

In some implementations, the frequency can be determined by adding the shutter speed to the illumination duration. The illumination points can be configured to be illuminated for an illumination duration at the frequency of the shutter speed+illumination duration.

In some implementations, a predefined set of camera settings can be stored in the timing calculator 306, along with associated shutter speeds, illuminations durations, and/or frequencies. Stored settings can be organized by type of camera, by type of stereoscopic movie being shot, by time or date, by the filmmaker's identity, to name just a few examples.

A strobe timer 308 can control vertical illumination points 310 and horizontal illumination points 312. The strobe timer can signal the vertical illumination points 310 and the horizontal illumination points 312 to periodically or otherwise repeatedly illuminate and darken according to the frequency and illumination duration determined by the timing calculator 306. For example, the strobe timer 308 can energize the vertical illumination points 310 and the horizontal illumination points 312 once every time the shutter is open, for a time corresponding to the illumination duration.

Figure 4:
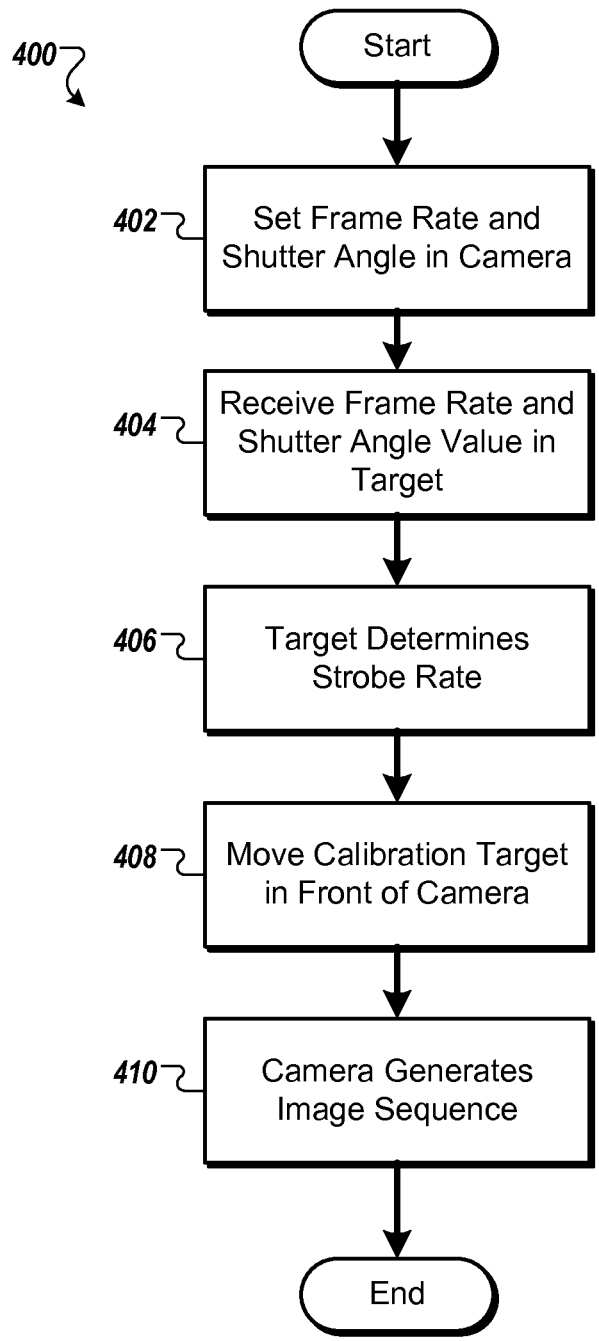
FIG. 4 is a flowchart of an example process for recording a calibration target.

FIG. 4 is a flowchart of an example process 400 for recording a calibration target. The process 400 can be performed, for example, using the system 100. In some implementations, the process 400 can be performed by users of a stereoscopic camera, after adjustments or maintenance, or before a shoot begins. The process 400 can produce an image sequence that can be used to calibrate a virtual stereoscopic camera, for example for use in post-processing footage taken after the process 400 is performed.

The frame rate and shutter angle of a camera are set (402). For example, a shutter with a known angle can be installed in a stereoscopic camera, and a timing device can be adjusted to set the frame rate. As another example, in a digital stereoscopic camera the frame rate and/or shutter angle can be specified using the camera's controls. In some implementations, these settings can be chosen based on artistic and/or technical goals for footage shot by the camera.

Frame rate and shutter angle values are received (404) in a calibration target. The frame rate and shutter angle values correspond to those set for the camera. The calibration target can determine (404) a strobe rate based on the camera settings received. A strobe rate can be chosen that causes illumination points to flash exactly once per exposure of the camera. If the received camera settings include the shutter angle and frame rate, the exposure length can be determined as described above.

The calibration target can be moved (408) in front of the camera while the illumination points strobe. Alternatively, the camera can move while keeping the calibration target in frame. The movement can provide the camera with different views of two surfaces of the calibration target, for example including illumination points on the surfaces. The camera generates (410) an image sequence of the calibration target from a plurality of angles. In some implementations, the images can be out of focus. In some implementations, the parallax between the primary view and secondary view of the calibration target by the camera can be determined by finding the disparity between the primary view and secondary view of each image in the image sequence. If the illumination points strobe once per image in the image sequence, the resulting calibration target in the image can appear to be 'frozen' at the location of the strobe.

Figure 5:
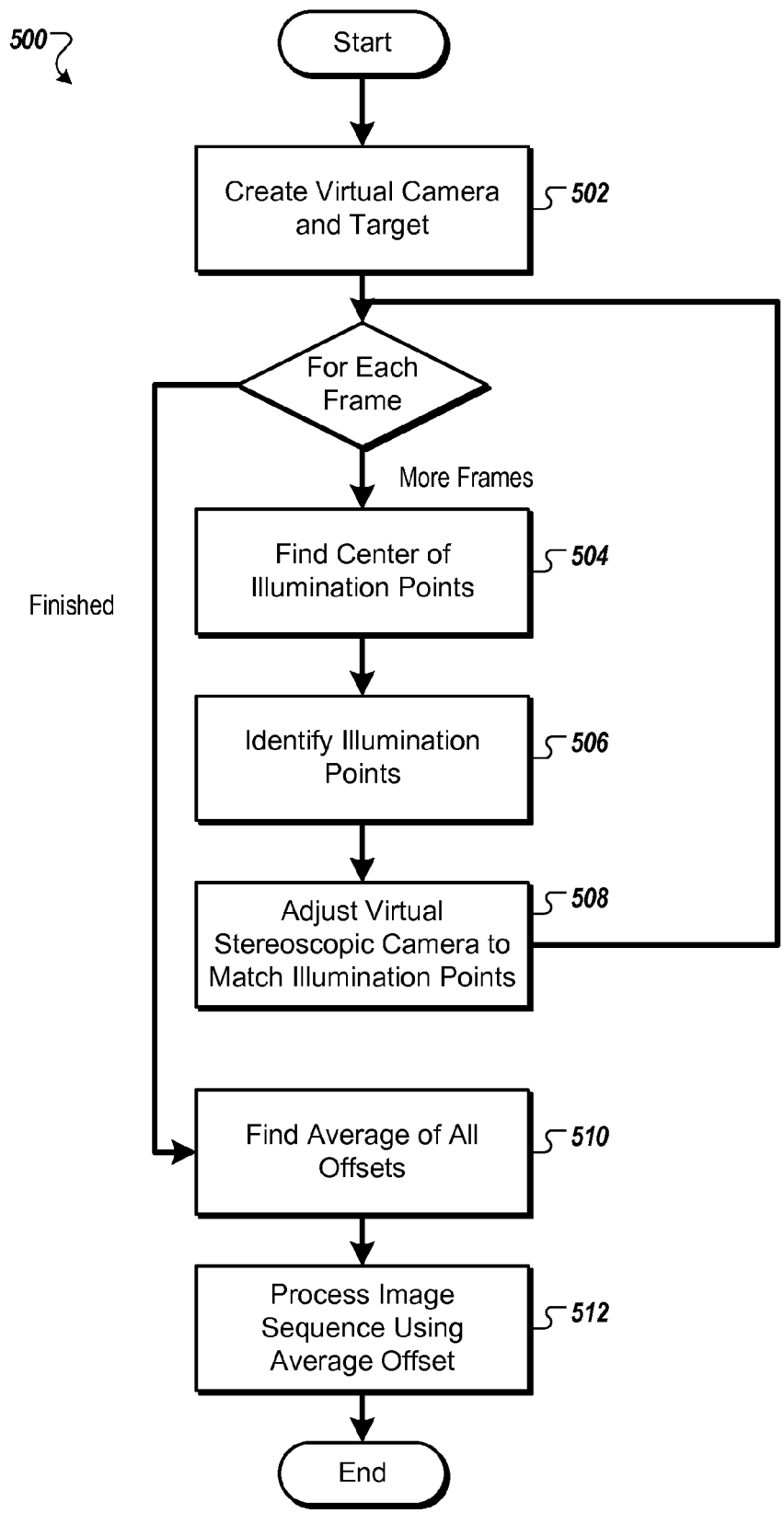
FIG. 5 is a flowchart of an example process for calculating a calibration value.

FIG. 5 is a flowchart of an example process 500 for calculating a calibration value. The process 500 can be performed by, for example, the virtual environment engine 108. The process 500 can be performed to calibrate a virtual stereoscopic camera to mimic a physical camera with which stereoscopic video footage has been recorded. The virtual stereoscopic camera can be used to render virtual objects for post-production of the stereoscopic video footage.

A virtual stereoscopic camera and calibration target are created (502) or instantiated. The virtual camera can comprise two view ports. The view ports can be positioned relative to each other according to the settings of a physical stereoscopic camera's offset. In some implementations, this initial positioning can be a default position, and unknown errors in the measurement of the physical stereoscopic camera can be incorporated in the view port's positions.

For each frame in an image sequence, centers of illumination are found (504); the illumination points are identified (506); and the virtual stereoscopic camera is adjusted (508) to match the illumination points. The image sequence can consist of stereoscopic images of a moving calibration target with strobing illumination points. The centers of the illumination points can be found using geometric center finding techniques, for both in focus images and out of focus images. Based on color and order, the illumination points in the images can be associated with illumination points on the virtual calibration target. For example, some or all of the illumination points can have different colors from each other. The patterning of the colors can then be used to uniquely determine the correct points in the virtual target.

The virtual calibration target can be oriented and placed in front of the virtual camera in a virtual environment at a position and distance consistent with the appearance of the calibration target in the image. For example, a known distance between illumination points can be used to determine the distance from the camera, and the coding of the colors of the illumination points can be used to determine the orientation.

The stereoscopic offset of the virtual stereoscopic camera can be adjusted to determine the stereoscopic offset of the physical stereoscopic camera. For example, after the adjustment, a rendering of the virtual calibration target by the virtual stereoscopic camera can produce an image with illumination point centers at the same position as the illumination point centers in the frame of the image sequence. If the virtually rendered image does not match the image shot with the camera, further adjustment of the virtual stereoscopic camera can be done. The determined stereoscopic offset of the virtual camera can be recorded for that frame and added to a collection of stereoscopic offsets.

An average of all offsets can be determined (510). For example, an arithmetic mean, median, or mode of each dimension of the stereoscopic offset can be found and used as the average. A second virtual stereoscopic camera can be created or instantiated in a virtual environment with the average offset. The second virtual camera can be used to process (512) a second image sequence.

For example, after the first image sequence of the calibration target is recorded by a physical stereoscopic camera, the same camera can record an actor interacting with a stand-in object (e.g., a ball on a pole). The stand-in object can be removed from the image sequence, and a geometric model of an animated movie character can be created and manipulated for the actor to interact with. The animated movie character can be rendered with the second virtual camera into a series of stereoscopic images that can be added to the image sequence to show the actor interacting with the animated movie character.

Figure 6:
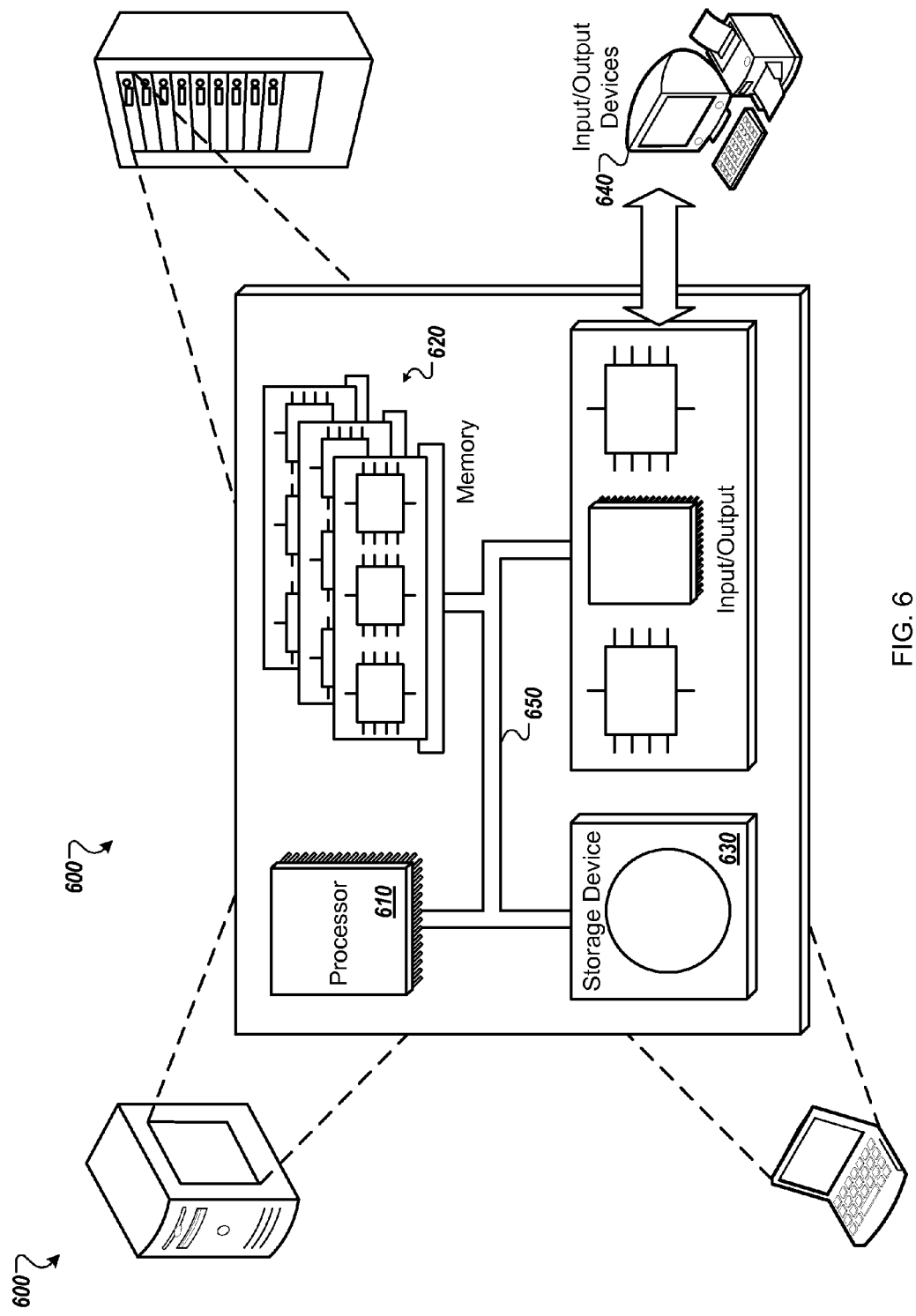
FIG. 6 is a block diagram of a computing system that can be used in connection with computer-implemented methods described in this document.

FIG. 6 is a schematic diagram of a generic computer system 600. The system 600 can be used for some or all of the operations described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit in some implementations and is a non-volatile memory unit in other implementations.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A calibration target for a stereoscopic camera, the calibration target comprising:
   a first planar surface having a first plurality of illumination points arranged thereon;
   a second planar surface parallel to and spaced apart from the first planar surface, the second planar surface having a window formed therein through which at least a portion of the first planar surface is visible and having a second plurality of illumination points arranged on at least two sides of the window; and
   circuitry, coupled to the first and second pluralities of illumination points, configured to set a strobe frequency of the first and second pluralities of illumination points.

2. The calibration target of claim 1, wherein each of the illumination points in the first plurality of illumination points is of a color in a first plurality of colors and each of the illumination points in the second plurality of illumination points is of a color in a second plurality of colors, the first plurality of colors not comprising any of the colors in the second plurality of colors.

3. The calibration target of claim 2, wherein the first plurality of illumination points and the second plurality of illumination points are color coded according to a predefined pattern.

4. The calibration target of claim 1, wherein the second planar surface is smaller than the first planar surface such that at least a portion of the first planar surface is visible through the window in and around.

5. The calibration target of claim 4, wherein the first and second surfaces are rectangular.

6. The calibration target of claim 1, wherein the first plurality of illumination points are arranged on the first surface in a first plurality of rows and the second plurality of illumination points are arranged on the second surface in a plurality of seconds rows perpendicular to the first plurality of rows.

7. The calibration target of claim 6, further comprising a plurality of supports coupled between the first and second planar surfaces, each of the plurality of supports having a length substantially equal to a distance the first and second planar surfaces are spaced apart from each other wherein the second illumination points are arranged in a second row on the second surface, the second row perpendicular to the first row.

8. The calibration target of claim 1, wherein the circuitry is configured to sets the strobe frequency based on user input to the circuitry.

9. The calibration target of claim 1, wherein the circuitry is configured to set strobe frequency based at least in part on a shutter speed value of the stereoscopic camera.

10. The calibration target of claim 9, wherein the circuitry comprises an interface for receiving a frame speed value and a shutter angle value, and
wherein the circuitry determines the shutter speed based on the frame speed and shutter angle.

11. The calibration target of claim 1, wherein each of the first and second pluralities of illumination points comprises a light emitting diode controlled by the circuitry.

12. The calibration target of claim 1, wherein each of the first and second pluralities of illumination points comprises a light tube controlled by the circuitry.

13. A method comprising:
moving a calibration target in front of a stereoscopic camera, the calibration target comprising first points on a first planar surface and second points on a second planar surface parallel to and spaced apart from the first planar surface, the second planar surface having a window formed therein through which at least a portion of the first planar surface is visible;
capturing, using the stereoscopic camera, an image sequence of the calibration target, the image sequence comprising pairs of left and right images of at least some of the first and second points;
determining a calibration value for the stereoscopic camera using the image sequence; and
processing the image sequence using the calibration value.

14. The method of claim 13, wherein the first and second points include illumination points, and the method further comprises strobing the illumination points at a strobe frequency while capturing the image sequence.

15. The method of claim 14, further comprising determining a frame speed, the strobe frequency selected based on the frame speed.

16. The method of claim 13, wherein the first points are out of focus in the image sequence.

17. The method of claim 16, further comprising performing a center-finding technique.

18. The method of claim 13, wherein determining the calibration value comprises: (i) creating a virtual calibration target, and virtual stereoscopic camera with the image sequence, in a virtual world (ii) identifying representations of at least some of the first and second points in the image sequence, and (iii) adjusting the virtual stereoscopic camera to match the identified representations.

19. A system comprising:
a stereoscopic camera; and
a calibration target for the stereoscopic camera, the calibration target comprising first points on a first planar surface and second points on a second planar surface parallel to and spaced apart from the first surface, the second planar surface having a window formed therein through which at least a portion of the first planar surface is visible and having a second plurality of illumination points arranged on at least two sides of the window.

20. The system of claim 19, wherein the first and second points include illumination points, and the system further comprise circuitry that sets a strobe frequency of the illumination points.

21. The system of claim 20, wherein the circuitry sets the strobe frequency to any of multiple predefined strobe frequencies; and
wherein the set strobe frequency is based at least in part on a shutter speed of the stereoscopic camera.

22. The system of claim 21, wherein the circuitry comprises an interface for receiving a frame speed value and a shutter angle value, and
wherein the circuitry determines the shutter speed based on the frame speed and shutter angle.

* * * * *

UNITED STATES PATENT AND TRADEMARK OFFICE
CERTIFICATE OF CORRECTION

| | | |
|---|---|---|
| PATENT NO. | : 9,519,976 B1 | Page 1 of 1 |
| APPLICATION NO. | : 13/015655 | |
| DATED | : December 13, 2016 | |
| INVENTOR(S) | : Jeffrey Saltzman | |

It is certified that error appears in the above-identified patent and that said Letters Patent is hereby corrected as shown below:

In the Claims

Column 11, Claim 8, Line 2:
Replace "is configured to sets the strobe frequency based on user input" with --is configured to set the strobe frequency based on user input--

Signed and Sealed this
Twenty-third Day of May, 2017

Michelle K. Lee
*Director of the United States Patent and Trademark Office*